(12) United States Patent
Anerousis et al.

(10) Patent No.: US 7,552,215 B2
(45) Date of Patent: Jun. 23, 2009

(54) METHOD, SYSTEM, AND COMPUTER PROGRAM PRODUCT FOR SUPPORTING A LARGE NUMBER OF INTERMITTENTLY USED APPLICATION CLUSTERS

(75) Inventors: Nikolaos Anerousis, Chappaqua, NY (US); Gennaro A. Cuomo, Cary, NC (US); Erik A. Daughtrey, Durham, NC (US); Brian K. Martin, Cary, NC (US); Giovanni Pacifici, New York, NY (US); Michael Spreitzer, Croton-On-Hudson, NY (US); Malgorzata Steinder, Fort Lee, NJ (US); Asser N. Tantawi, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 10/953,325

(22) Filed: Sep. 29, 2004

(65) Prior Publication Data
US 2006/0075101 A1    Apr. 6, 2006

(51) Int. Cl.
*G06F 15/173* (2006.01)
(52) U.S. Cl. ............... 709/225; 709/202; 709/205; 709/223; 709/226; 709/229; 718/102
(58) Field of Classification Search ............. 709/225
See application file for complete search history.

(56) References Cited

U.S. PATENT DOCUMENTS

| 7,134,011 | B2 * | 11/2006 | Fung ........................ 713/100 |
| 2002/0004912 | A1 | 1/2002 | Fung |
| 2002/0147652 | A1 | 10/2002 | Gheith et al. |
| 2003/0055967 | A1 * | 3/2003 | Worley ..................... 709/226 |
| 2004/0243650 | A1 * | 12/2004 | McCrory et al. ............ 707/203 |
| 2005/0005200 | A1 * | 1/2005 | Matena et al. ................ 714/38 |

FOREIGN PATENT DOCUMENTS

EP        0 684 558 A1    11/1995

* cited by examiner

*Primary Examiner*—Larry D Donaghue
*Assistant Examiner*—Nicholas Taylor
(74) *Attorney, Agent, or Firm*—A. Bruce Clay; Hoffman Warnick LLC

(57) ABSTRACT

The present invention provides a method, system, and computer program product for supporting a large number of intermittently used application clusters without consuming all the resources needed to run server processes for all the application clusters all the time. A method in accordance with the present invention comprises: holding an application request for a dormant application cluster in a holding zone; changing a status of the dormant application cluster to active; changing a status of an unused active application cluster to dormant; stopping server processes for the newly dormant application cluster; starting server processes for the newly active application cluster; and directing the application request held in the holding zone to the server processes for the newly active application cluster.

3 Claims, 6 Drawing Sheets

METHOD, SYSTEM, AND COMPUTER PROGRAM PRODUCT FOR SUPPORTING A LARGE NUMBER OF INTERMITTENTLY USED APPLICATION CLUSTERS

BACKGROUND OF THE INVENTION

1. Field of the Invention

The present invention generally relates to network computing. More particularly, the present invention provides a method, system, and computer program product for supporting a large number of intermittently used application clusters.

2. Related Art

FIG. 1 depicts an illustrative prior art system 10 in which a router and load balancer 12 is used to route application requests 14 from a plurality of clients 16 (e.g., web clients such as a web browser) to application clusters 24 (e.g., servers running web applications) running on a host farm 18, based on a list 19 of active application clusters 24 and their locations in the host farm 18. The host farm 18 includes several host machines 20, and each host machine 20 typically runs a plurality of server processes 22. Each server process 22 serves one particular application cluster 24 (e.g., application cluster "a," "b," or "c"), and that application cluster 24 may have several server processes 22 dedicated to it. A server process 22 is a "member" of the application cluster 24 it serves. In FIG. 1, there are three application clusters 24. Each server process 22 is labeled (i.e., as "a," "b," or "c") to indicate the application cluster 24 supported by that server process 22. An application placement system 28 determines the number of server processes 22 for each application cluster 24 and where to place each of those server processes 22 in the host farm 18. Application placement may be performed manually (e.g., by an operator, administrator, etc.) or automatically. The operation of system 10 is assumed to be within the purview of one skilled in the art. Accordingly, a detailed discussion of the operation of system 10 will not be provided herein.

System 10 does not scale efficiently for large numbers of application clusters 24, especially when the application clusters 24 are not all concurrently in use at any given time. For example, consider the case where system 10 supports hundreds or thousands of application clusters 24 instead of only three. Since each host machine 20 can run only a limited number of server processes 22 due to the physical limitations of the host machine 20, a large number of host machines 20 would be required to provide all of the server processes 22 needed to support a large number of application clusters 24. Further, a significant fraction of the application clusters 24 may be unused at any given time, resulting in low resource utilization.

Accordingly, a need exists for automatically starting and terminating server processes for application clusters in response to time-varying offered load or other events.

SUMMARY OF THE INVENTION

In general, the present invention provides a method, system, and computer program product for supporting a large number of intermittently used application clusters, without consuming all the resources needed to run server processes for all the application clusters all the time. In particular, the present invention automatically starts and terminates server processes for application clusters in a host farm in response to time-varying offered load or other events (such as time of the day, user policy, etc.). This frees up host machine capacity that can then be used either to run additional server processes for other application clusters or to serve other needs. To this extent, the host farm can support more server processes than it is capable of concurrently running.

The present invention divides application clusters into two sets: active and dormant. The determination of whether an application cluster is active or dormant is based on a configured policy, and several different types of policies are possible. While an application cluster is dormant, the application placement system may stop some or all of the cluster's members, to free up computing capacity for other purposes. A "holding zone" is provided for temporarily holding application requests for application clusters that have no server processes. In response to the receipt of an application request for such an application cluster (which is necessarily dormant), the application cluster is then made active, some server process(es) are started for that application cluster, and the temporarily held request(s) are directed toward the new server process(es).

A first aspect of the present invention is directed to a method for supporting a large number of intermittently used application clusters, comprising: holding an application request for a dormant application cluster in a holding zone; changing a status of the dormant application cluster to active; changing a status of an unused active application cluster to dormant; stopping server processes for the newly dormant application cluster; starting server processes for the newly active application cluster; and directing the application request held in the holding zone to the server processes for the newly active application cluster. It should be noted that the above method steps can occur in many different orders (even simultaneously), depending upon the specific implementation of the invention and other factors. For example, the status of an unused active application cluster can be changed to dormant and its corresponding server processes stopped, before those server processes are actually needed by a newly active application cluster. As such, the order of the method steps is not intended to be limiting in any way.

A second aspect of the present invention is directed to a system for supporting a large number of intermittently used application clusters, comprising: a holding zone for holding an application request for a dormant application cluster; a system for changing a status of the dormant application cluster to active; a system for changing a status of an unused active application cluster to dormant; a system for stopping server processes for the newly dormant application cluster; a system for starting server processes for the newly active application cluster; and a system for directing the application request held in the holding zone to the server processes for the newly active application cluster.

A third aspect of the present invention is directed to a program product stored on a recordable medium for supporting a large number of intermittently used application clusters, which when executed comprises: program code for holding an application request for a dormant application cluster in a holding zone; program code for changing a status of the dormant application cluster to active; program code for changing a status of an unused active application cluster to dormant; program code for stopping server processes for the newly dormant application cluster; program code for starting server processes for the newly active application cluster; and program code for directing the application request held in the holding zone to the server processes for the newly active application cluster.

A fourth aspect of the present invention is directed to a method for deploying an application for supporting a large number of intermittently used application clusters, comprising: providing a computer infrastructure being operable to: hold an application request for a dormant application cluster in a holding zone; change a status of the dormant application cluster to active; change a status of an unused active application cluster to dormant; stop server processes for the newly dormant application cluster; start server processes for the newly active application cluster; and direct the application request held in the holding zone to the server processes for the newly active application cluster.

A fifth aspect of the present invention is directed to computer software embodied in a propagated signal for supporting a large number of intermittently used application clusters, the computer software comprising instructions to cause a computer system to perform the following functions: hold an application request for a dormant application cluster in a holding zone; change a status of the dormant application cluster to active; change a status of an unused active application cluster to dormant; stop server processes for the newly dormant application cluster; start server processes for the newly active application cluster; and direct the application request held in the holding zone to the server processes for the newly active application cluster.

BRIEF DESCRIPTION OF THE DRAWINGS

These and other features of this invention will be more readily understood from the following detailed description of the various aspects of the invention taken in conjunction with the accompanying drawings in which.

Figure 1:
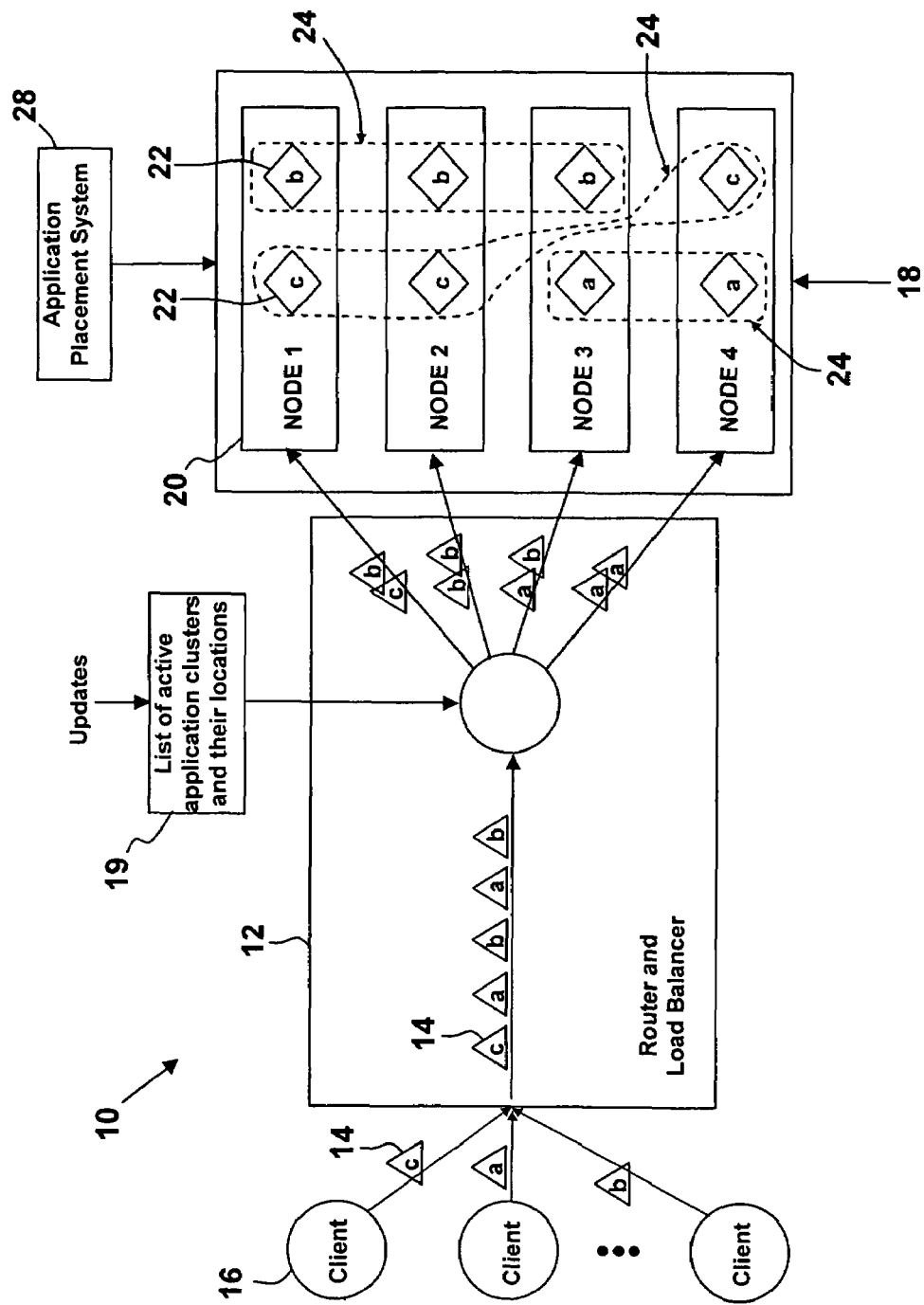
FIG. 1 depicts a system for routing application requests from a plurality of clients to application clusters in a host farm in accordance with the prior art.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for supporting a large number of intermittently used application clusters, without consuming all the resources needed to run server processes for all the application clusters all the time. In particular, the present invention automatically starts and terminates server processes for application clusters in a host farm in response to time-varying offered load or other events (such as time of the day, user policy etc). This frees up host machine capacity that can then be used either to run additional server processes for active application clusters or to serve other needs. To this extent, the host farm can support more server processes than it is capable of concurrently running.

Figure 2:
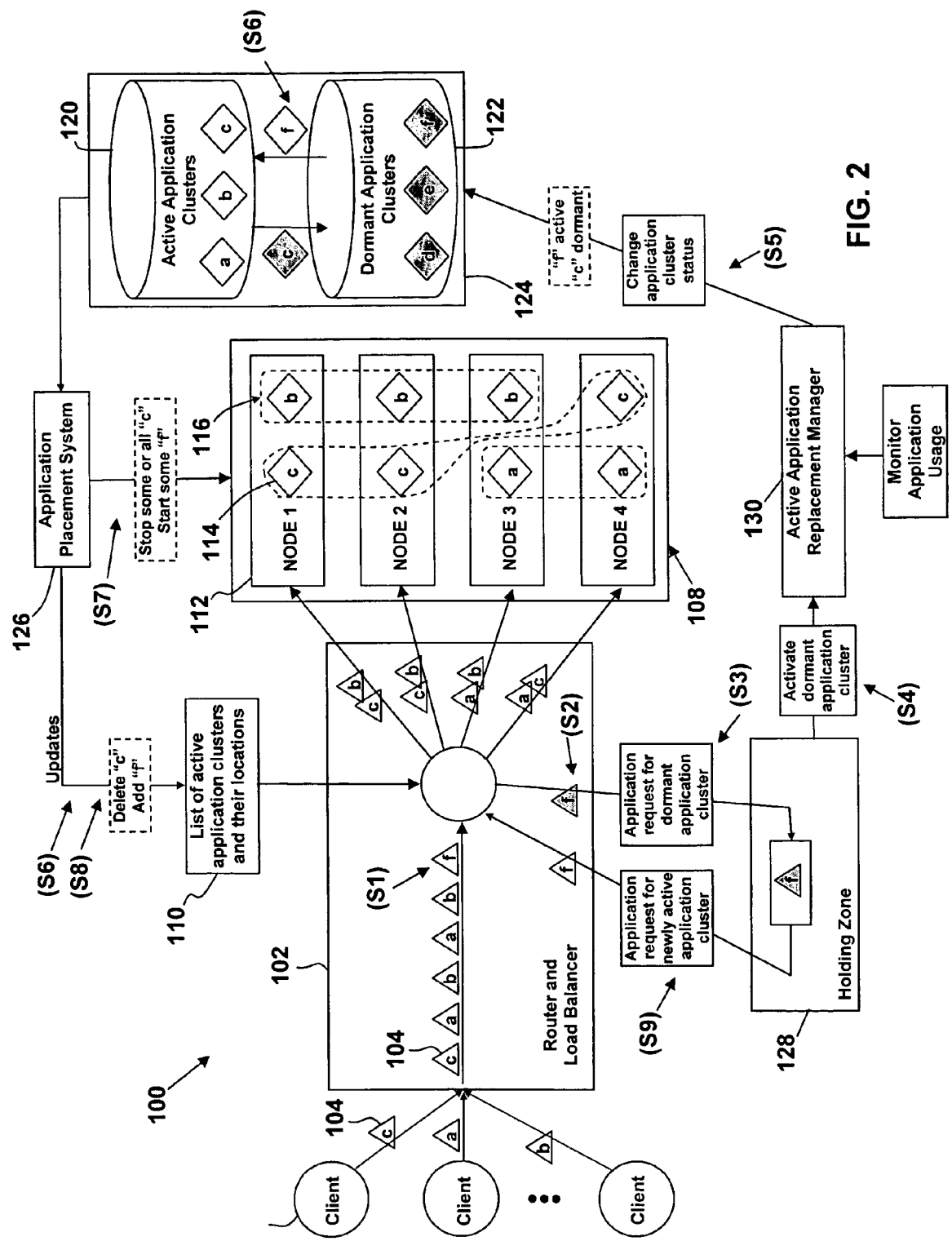
FIG. 2 depicts a system for routing application requests from a plurality of clients to application clusters in a host farm in accordance with an embodiment of the present invention.

FIG. 2 depicts a system 100 in accordance with an embodiment of the present invention, in which a router and load balancer 102 is used to route application requests 104 from a plurality of clients 106 to application clusters 116 running on a host farm 108, based on a list 110 of active application clusters 116 and their locations in the host farm 108. The host farm 108 includes several host machines (nodes) 112, and each host machine 112 typically runs a plurality of server processes 114. Each server process 114 serves one particular application cluster 116 (e.g., application cluster "a," "b," . . . , "f"), and that application cluster 116 may have several server processes 114 dedicated to it. A server process 114 in an application cluster 116 is also called a cluster member.

In FIG. 2, application clusters 116 "a," "b," and "c" are currently active, while application clusters 116 "d," "e," and "f" are currently dormant. Lists 120, 122 of the currently active and dormant application clusters 116, respectively, are stored in storage unit 124 (e.g., a database). The lists 120, 122 of active and dormant application clusters 116 need not be external databases as shown in FIG. 2. For example, the lists 120, 122 can be maintained by tagging information already kept elsewhere (e.g., in an application placement system 128 and/or active application replacement manager 130, described below).

An application placement system 126 determines the number of server processes 114 needed for each active application cluster 116, and where to place those server processes 114 on the host machines 112 of the host farm 108. Application placement may be performed manually (e.g., by an operator, administrator, etc.) or automatically. Updates to the list 110 of active application clusters 116 and their locations can be provided by the application placement system 126 as shown in FIG. 2. Updates can also be provided by other sources including, for example, the host machines 112 and/or server processes 114 themselves, or via some other management component in system 100.

System 100 includes at least one holding zone 128 for temporarily holding application requests 104 for dormant application clusters 116. In FIG. 2, for example, an application request for application cluster "f" has been received by the router and load balancer 102. The router and load balancer 102 has determined or has been informed that application cluster "f" is dormant, and has sent the application request 104 for application cluster "f" to the holding zone 128. In the figures, application requests 104 for active application clusters 116 are designated by unshaded triangles, while application requests 104 for dormant application clusters 116 are designated by shaded triangles. The holding zone 128 may comprise a buffer or other suitable storage device. In general, the holding zone 128 holds application requests 104 that cannot be served immediately because they are destined for dormant application clusters 116 that currently have no server processes 114. It should be noted that any suitable now known or later developed router and load balancer 102 can be used in the practice of the present invention.

The dormancy of an application cluster 116 can be determined by, or provided to, the router and load balancer 102 in many different ways. For example, the router and load balancer 102 can examine the list 110 of active application clusters 116 and their locations provided by the application placement system 126 to determine if an application cluster 116 corresponding to an application request 104 received from a client 106 is active or dormant. Other techniques for determining the dormancy of an application cluster 116 are also possible. Regardless of how the dormancy of an application cluster 116 is determined, an application request 104 for a dormant application cluster 116 is sent to the holding zone 128 by the router and load balancer 102.

The holding zone 128 can be a separate subsystem of system 100 as shown or can be embedded in the router and load balancer 102. Other locations for the holding zone 128 within system 100 are also possible. For example, the holding zone 128 can appear as a regular server process 114 from the point of view of the router and load balancer 102 (see also FIG. 5). This allows the holding zone 128 to work without having to make changes to the router and load balancer 102. This, in turn, means that the present invention is applicable to systems that provide routing and load balancing in a wide variety of ways. In this case, the router and load balancer 102 will not distinguish between dormant application clusters 116 and active application clusters 116. Rather, the application placement system 126 will inform the router and load balancer 102 of each application cluster 116 regardless of whether it is dormant or active, configure the router and load balancer 102 to route requests for each application cluster 116 that has no server processes 114 to the holding zone 128, and configure the router and load balancer 102 to route application requests 104 for each application cluster 116 that has some server processes 114 to those server processes. It should be noted that in some cases, a dormant application cluster 116 may be allowed to retain some server processes until their computing capacity is positively needed for some other task.

The process of getting an application request 104 from one intermediate process to another (e.g., router and load balancer 102 to holding zone 128, holding zone 128 to server process 114, etc.) can be accomplished in a number of ways. For example, it may comprise direct forwarding. An alternative is to return the application request 104 to the client 106 with an annotation saying to resend the application request 104 to the desired destination (e.g., with an HTTP response code in the 300 range, which signals a redirect). Further, the holding zone 128 could be effectively located at a client 106 as follows: to put an application request 104 in the holding zone, a reply is returned to the client 106 that causes the client 106 to pause for a period of time and then send the application request 104 again.

The system 100 further includes an active application replacement manager 130 for changing the active/dormant status of application clusters 116. The holding zone 128 informs the active application replacement manager 130 that an application request 104 for a dormant application cluster 116 has been received. In response, the active application replacement manager 130 changes the status of a currently active, but unused application cluster 116 in the host farm 108 to dormant and changes the status of the dormant application cluster 116 requested by an application request 104 held in the holding zone 128 to active. The lists 120, 122 of active and dormant application clusters 116 are updated accordingly, and the list 110 of active application clusters 116 and their locations is notified regarding the newly dormant application cluster 116. Based on the updated lists 120, 122, the application placement system 126 stops (some or all of) the server processes 114 in the application cluster 116 corresponding to the newly dormant application cluster 116 and starts a number of server processes 114 to activate an application cluster 116 in the host farm 108 corresponding to the newly activated application cluster 116. It should be noted that the functions provided by the application placement system 126 can be incorporated into the active application replacement manager 130. The updated status of the newly activated application cluster 116 is reflected in the list 110 of active application clusters 116 and their locations. The application request 104 for the newly activated application cluster 116 is then forwarded by the holding zone 128 to the router and load balancer 102, which then forwards the application request 104 to the corresponding server processes 114 in the host farm 108 for servicing.

The active application replacement manager 130 monitors the usage of the application clusters 116 currently active in the host farm 108 and makes the decision of which active application cluster 116 to make dormant based on the usage. For example, the active application replacement manager 130 may deem that an application cluster 116 should be made dormant if it has not received an application request 104 within a certain amount of time into the past. The application usage data can be obtained from several different sources within system 100 including, for example, the router and load balancer 102, the host machines 112, the server processes 114, or from some other management component. Many other techniques for determining application usage are also possible. Other policies, conditions, schedules, etc., which may or may not take application usage into account, may also be used by the active application replacement manager 130 to determine which active application cluster 116 to make dormant.

Figure 3:
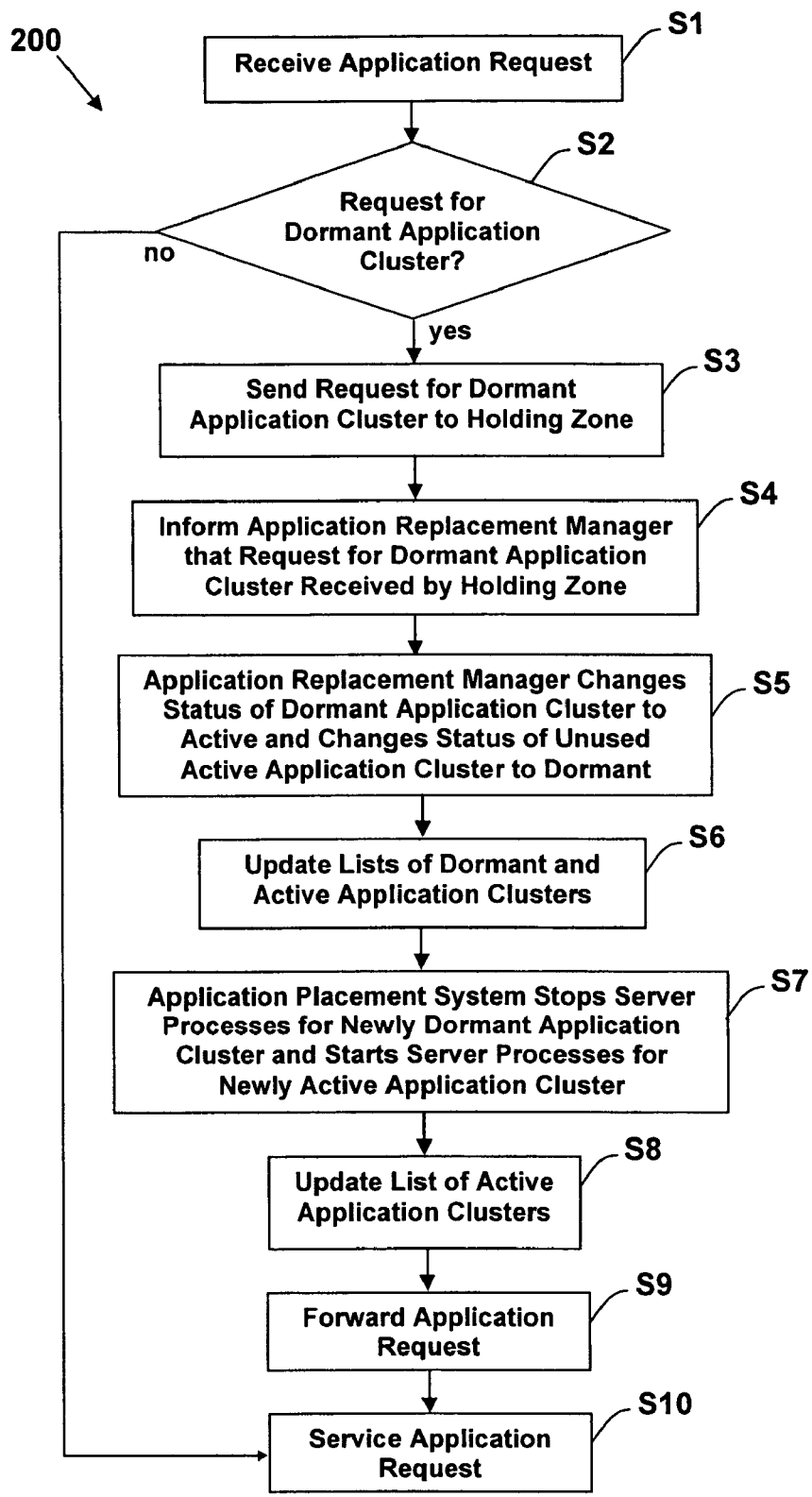
FIG. 3 depicts a flow diagram of a method in accordance with an embodiment of the present invention.

A flow diagram 200 illustrating a method in accordance with an embodiment of the present invention is illustrated in FIG. 3. In the following description of the flow diagram 300, reference will be made to components of the system 100 illustrated in FIG. 2. The steps referenced in the flow diagram 200 are also depicted in FIG. 2.

Figure 4:
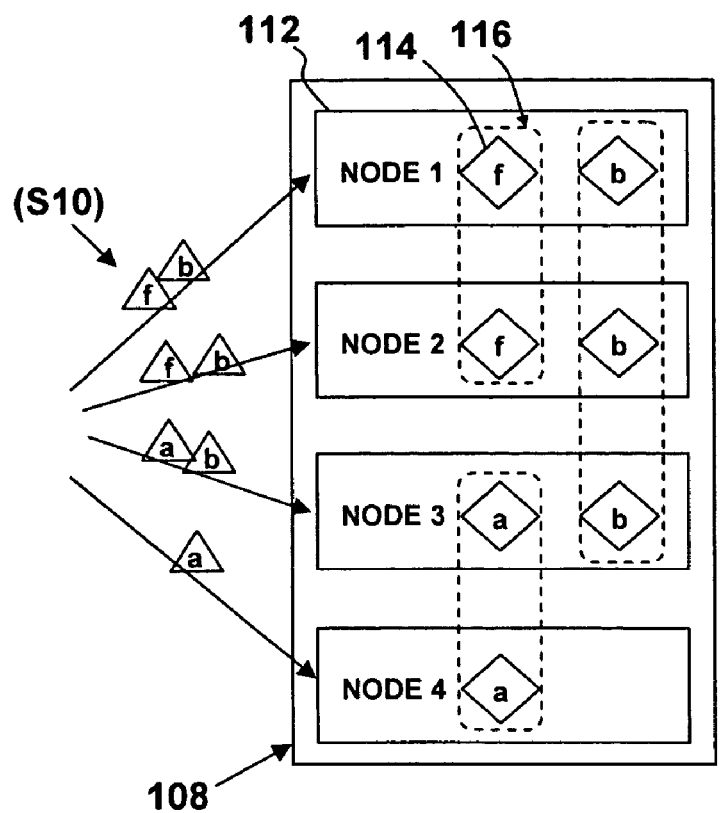
FIG. 4 depicts a portion of the system of FIG. 2.

In step S1, an application request 104 (e.g., for application cluster "f") sent by a client 106 is received by the router and load balancer 102. In step S2, the router and load balancer 102 determines, or is informed, whether application cluster "f" has any server processes 114 in the host farm 108. If the application request 104 is for an application cluster 116 that has some server processes 114, the application request 104 is handled in a conventional manner (step S10). In step S3, the application request 104 for dormant application cluster "f" is sent to the holding zone 128. After receiving the application request 104 for dormant application cluster "f," the holding zone 128 informs the active application replacement manager 130 that an application request 104 for dormant application cluster "f" has been received (step S4). In step S5, after receiving notification that the holding zone 128 has received an application request 104 for dormant application cluster "f," the active application replacement manager 130 changes the status of at least one currently active, but unused, application cluster 116 (e.g., application cluster "c") to dormant and changes the status of dormant application cluster "f" to active. In step S6, the lists 120, 122 of active and dormant application clusters 116 are updated, and the list 110 of active application clusters 116 and their locations is updated to reflect the dormancy of newly dormant application cluster "c." In step S7, based on the updated lists 120, 122, the application placement system 126 stops (some or all of) the server processes 114 in the application cluster 116 corresponding to newly dormant application cluster "c" and starts a number of server processes 114 in the host farm 108 for the newly activated application cluster "f." An example of how the host farm 108 would look at this point in the process is shown in FIG. 4. As can be seen in FIG. 4, the host farm 108 now includes server processes 114 for application cluster "f," while no server processes 114 are present for application cluster "c." In step S8, the list 110 of active application clusters 116 and their locations is updated regarding newly activated application cluster "f." In step S9, the application request 104 for newly activated application cluster "f" is forwarded from the holding zone 128 to the router and load balancer 102, which then forwards (step S10) the application request 104 for newly activated application cluster "f" to the corresponding server processes 114 in the host farm 108 for servicing (see also FIG. 4). When the holding zone 128 is implemented by sending a message to the client 106 that instructs the client 106 to resend an application request 104 after a time out, step S9 will be implemented by the client 106 or client proxy.

Figure 5:
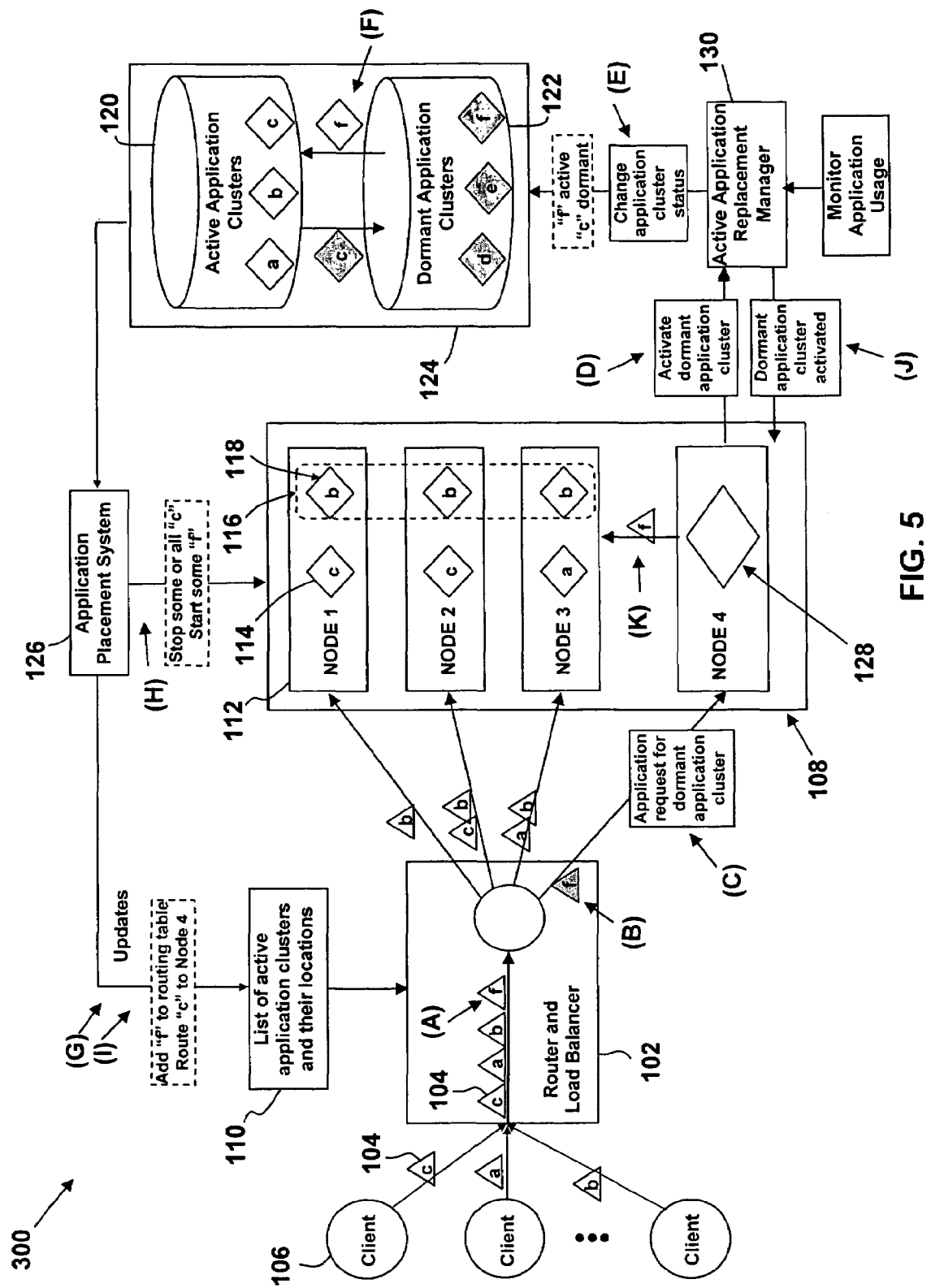
FIG. 5 depicts a system for routing application requests from a plurality of clients to application clusters in a host farm in accordance with another embodiment of the present invention.
Figure 6:
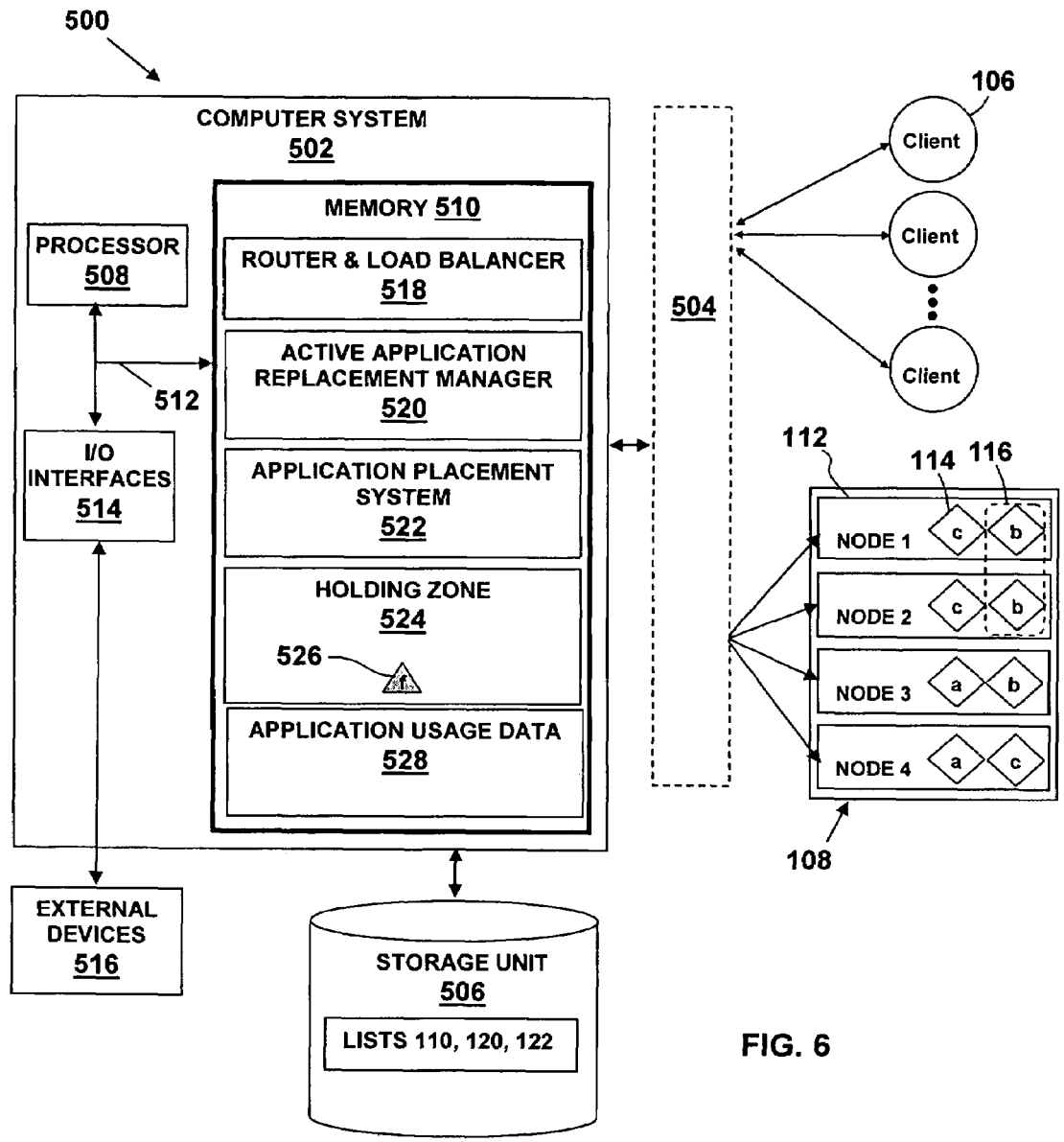
FIG. 6 depicts a computer system for implementing the present invention.

A system 300 for routing application requests 104 from a plurality of clients 106 to application clusters 116 in a host farm 108 in accordance with another embodiment of the present invention is illustrated in FIG. 5. In system 300, the holding zone 128 is now provided as a server process 114 on a host machine 112 in the host farm 108. In operation, an application request 104 (e.g., for application cluster "f") sent by a client 106 is received by the router and load balancer 102 (step A, FIG. 5). While an application cluster 116 is dormant, the router and load balancer 102 is configured to route application requests 104 for the dormant application cluster 116 to the holding zone 128 server process (running on Node 4 in the example of FIG. 5). The holding zone 128 behaves as a regular server process as far as the router and load balancer 102 or browser is concerned. To this extent, no changes to current load balancing and routing technology is required. In this embodiment, the router and load balancer 102 does not distinguish between dormant and active application clusters 116 and is configured in a conventional manner. When an application cluster 116 is active, the router and load balancer 102 is configured to route application requests 104 for the active application cluster 116 to the members of the active application cluster 116.

After receiving the application request 104 for dormant application cluster "f," the holding zone 128 informs the active application replacement manager 130 that an application request 104 for dormant application cluster "f" has been received (step D). After receiving notification that the holding zone 128 has received an application request 104 for dormant application cluster "f," the active application replacement manager 130 changes the status of an active, but unused, application cluster 116 (e.g., application cluster "c") in the host farm 108 to dormant and changes the status of dormant application cluster "f" to active (step E). The lists 120, 122 of the active and dormant application clusters 116 are then updated (step F), and the list 110 of active application clusters 116 and their locations is updated to reflect the dormancy of newly dormant application cluster "c" (step G). Application requests 104 for newly dormant application cluster "c" will then be directed to the holding zone 128 by the router and load balancer 102. Based on the updated lists 120, 122 of the active and dormant application clusters 116, the application placement system 126 stops (some or all of) the server processes 114 in the application cluster 116 corresponding to newly dormant application cluster "c" and starts a number of server processes 114 in the host farm 108 corresponding to newly activated application cluster "f" (step H). The list 110 of active application clusters 116 and their locations is then updated (step I) to include newly activated application cluster "f." The active application replacement manager 130 then informs the holding zone 128 that application cluster "f" corresponding to the application request 104 held in the holding zone 128 has been activated (step J). The holding zone 128 then forwards the application request for newly activated application cluster "f" to the corresponding server processes 114 in the host farm 108 for servicing (step K).

An illustrative system 500 for implementing the present invention is illustrated in FIG. 5. System 500 is only one of many different systems that can be used in the practice of the present invention and is not intended to be limiting.

System 500 comprises a computer system 502 or the like that is capable of providing the functions described herein. Computer system 502 is connected over a network 504 to at least one client 106 and a host farm 108 comprising a plurality of host machines 112. Network 504 is intended to represent any type of network over which data can be transmitted. For example, network 504 can include the Internet, a wide area network (WAN), a local area network (LAN), a virtual private network (VPN), a WiFi network, a personal area network (PAN), or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the computer system 502.

Data (e.g., the list 110 of active application clusters 116 and their locations, the lists 120, 122 of active and dormant application clusters 116, etc.) required to practice the present invention can be stored locally to computer system 502, for example, in a storage unit 506, and/or may be provided over a network such as network 504. The storage unit 506 can comprise any system capable of providing storage for data and information under the present invention. As such, the storage unit 506 may reside at a single physical location, comprising one or more types of data storage, or may be distributed across a plurality of physical systems in various forms. In another embodiment, the storage unit 506 may be distributed across, for example, a local area network (LAN), wide area network (WAN) or a storage area network (SAN) (not shown).

As shown, computer system 502 generally includes a processor 508, memory 510, bus 512, input/output (1/0) interfaces 514 and external devices/resources 516. Clients 106 and host machines 112 generally includes similar components (e.g., processor, memory, bus, input/output (1/0) interfaces, and external devices/resources).

Processor 508 may comprise a single processing unit, or may be distributed across one or more processing units in one or more locations, e.g., on a client and server. Memory 510 may comprise any known type of data storage and/or transmission media, including magnetic media, optical media, random access memory (RAM), read-only memory (ROM), etc. Moreover, similar to processor 508, memory 510 may reside at a single physical location, comprising one or more types of data storage, or be distributed across a plurality of physical systems in various forms.

I/O interfaces 514 may comprise any system for exchanging information to/from an external source. External devices/resources 516 may comprise any known type of external device, including speakers, a CRT, LED screen, handheld device, keyboard, mouse, voice recognition system, speech output system, printer, monitor/display, facsimile, pager, etc.

Bus 512 provides a communication link between each of the components in computer system 502, and likewise may comprise any known type of transmission link, including electrical, optical, wireless, etc. In addition, although not shown, other components, such as cache memory, communication systems, system software, etc., may be incorporated into computer system 502.

Shown in memory 510 are a router and load balancer 518, an active application replacement manager 520, and an application placement system 522, each of which may be provided as a computer program product. The router and load balancer controller 518, active application replacement manager 520, and application placement system 522 provide the functions described above with regard to the router and load balancer 102, active application replacement manager 130, and application placement system 126, respectively (FIG. 2). Also shown in memory is a holding zone 524 for holding application requests 526 for dormant application clusters 116 (e.g., dormant application cluster "f").

An application request 526 (e.g., for application cluster "f") sent by a client 106 over network 504 is received by the router and load balancer 518. The router and load balancer 518 determines or is informed that application cluster "f" is dormant. As a result, the application request 526 for dormant application cluster "f" is sent to the holding zone 524. After receiving the application request 526 for dormant application cluster "f," the holding zone 524 informs the active application replacement manager 520 that an application request 526 for dormant application cluster "f" has been received. After receiving notification that the holding zone 524 has received an application request 526 for dormant application cluster "f," the active application replacement manager 520 changes the status of at least one currently active, but unused, application cluster 116 (e.g., application cluster "c") to dormant and changes the status of dormant application cluster "f" to active. The decision of which currently active application cluster 116 to convert into a dormant application cluster 116 can be based, for example, on application usage data 528 stored in memory 510 and/or storage device 506. Based on the status change, the lists 120, 122 of active and dormant application clusters 116 are updated, and the list 110 of active application clusters 116 and their locations is updated to reflect the dormancy of newly dormant application cluster "c." Based on the updated lists 120, 122, the application placement system 522 stops (some or all of) the server processes 114 in the application cluster 116 corresponding to newly dormant application cluster "c" and starts a number of server processes 114 to activate an application cluster 116 in the host farm 108 corresponding to newly activated application cluster "f." The list 110 of active application clusters 116 and their locations is then updated regarding newly activated application cluster "f," and the application request 526 for newly activated application cluster "f" is forwarded from the holding zone 524 (e.g., via the router and load balancer 518) to the appropriate server processes 114 in the host farm 108 for servicing.

It should be appreciated that the teachings of the present invention can be offered as a business method on a subscription or fee basis. For example, system 500 could be created, maintained, supported, and/or deployed by a service provider that offers the functions described herein for customers. That is, a service provider could be used to start/stop server processes for application clusters in a host farm in response to time-varying offered load.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. For instance, application clusters 116 can be proactively made dormant and/or the members of application clusters 116 can be stopped and started at many different times, in response to many different circumstances. As such, a request might arrive for a dormant application cluster 116 but there is enough computing capacity available to start a new server process 114 without stopping any other server processes 114 at that time; one such circumstance would be that some other server processes 114 were proactively stopped earlier, for an application cluster 116 that was proactively marked dormant even earlier. Such modifications and variations that may be apparent to a person skilled in the art are intended to be included within the scope of this invention as defined by the accompanying claims.

We claim:

1. A method for supporting a large number of intermittently used application clusters located on a host farm comprising a plurality of host machines, comprising:

monitoring usage of a plurality of active application clusters;

selecting which of the plurality of active application clusters to make dormant based on the monitored application usage or a policy;

receiving an application request from a client at a router and load balancer;

determining if the application cluster corresponding to the application request received from the client is active or dormant;

the router and load balancer directing the application request to a holding zone for holding the application request, if the application cluster is determined to be dormant, the holding zone comprising a server process on the host farm;

changing a status of the dormant application cluster to active;

changing a status of an unused active application cluster to dormant;

stopping all server processes for a newly dormant application cluster;

starting server processes for a newly active application cluster;

directing the application request held in the holding zone to the server processes for the newly active application cluster;

updating information regarding the active and dormant application clusters in response to the status changes; and stopping and starting server processes in the newly dormant and newly active application clusters, respectively, based on the updated information;

wherein changing a status of an unused active application cluster to dormant and stopping server processes for a newly dormant application cluster can occur any time before changing a status of the dormant application cluster to active.

2. A system for supporting a large number of intermittently used application clusters located on a host farm comprising a plurality of host machines, comprising:
   at least one computer, including:
   a system for monitoring usage of a plurality of active application clusters;
   a system for selecting which of the plurality of active application clusters to make dormant based on the monitored application usage or a policy;
   a system for receiving an application request from a client at a router and load balancer;
   a system for determining if the application cluster corresponding to the application request received from the client is active or dormant;
   the router and load balancer directing the application request to a holding zone for holding the application request, if the application cluster is determined to be dormant, the holding zone comprising a server process on the host farm;
   a system for changing a status of the dormant application cluster to active;
   a system for changing a status of an unused active application cluster to dormant;
   a system for stopping all server processes for a newly dormant application cluster;
   a system for starting server processes for a newly active application cluster;
   a system for directing the application request held in the holding zone to the server processes for the newly active application cluster;
   a system for updating information regarding the active and dormant application clusters in response to the status changes; and
   a system for stopping and starting server processes in the newly dormant and newly active application clusters, respectively, based on the updated information;
   wherein changing a status of an unused active application cluster to dormant and stopping server processes for a newly dormant application cluster can occur any time before changing a status of the dormant application cluster to active.

3. A program product stored on a recordable medium, which when executed, supports a large number of intermittently used application clusters located on a host farm comprising a plurality of host machines, the program product comprising program code for:
   monitoring usage of a plurality of active application clusters;
   selecting which of the plurality of active application clusters to make dormant based on the monitored application usage or a policy;
   receiving an application request from a client at a router and load balancer;
   determining if the application cluster corresponding to the application request received from the client is active or dormant;
   the router and load balancer directing the application request to a holding zone for holding the application request, if the application cluster is determined to be dormant, the holding zone comprising a server process on the host farm;
   changing a status of the dormant application cluster to active;
   changing a status of an unused active application cluster to dormant;
   stopping all server processes for a newly dormant application cluster;
   starting server processes for a newly active application cluster;
   directing the application request held in the holding zone to the server processes for the newly active application cluster;
   updating information regarding the active and dormant application clusters in response to the status changes; and
   stopping and starting server processes in the newly dormant and newly active application clusters, respectively, based on the updated information;
   wherein changing a status of an unused active application cluster to dormant and stopping server processes for a newly dormant application cluster can occur any time before changing a status of the dormant application cluster to active.

* * * * *